(12) United States Patent
Aggarwal et al.

(10) Patent No.: US 9,383,794 B2
(45) Date of Patent: Jul. 5, 2016

(54) INTEGRATED CIRCUIT WITH MULTI-VOLTAGE INPUT/OUTPUT (I/O) CELLS

(71) Applicants: Amit Aggarwal, Ghaziabad (IN); Rohit Gupta, Panchkula (IN); Ashish Malhotra, Noida (IN); Andrey Malkov, Moscow (RU); Evgeny A. Shevchenko, Moscow (RU)

(72) Inventors: Amit Aggarwal, Ghaziabad (IN); Rohit Gupta, Panchkula (IN); Ashish Malhotra, Noida (IN); Andrey Malkov, Moscow (RU); Evgeny A. Shevchenko, Moscow (RU)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 116 days.

(21) Appl. No.: 14/568,074

(22) Filed: Dec. 11, 2014

(65) Prior Publication Data

US 2015/0362970 A1 Dec. 17, 2015

(30) Foreign Application Priority Data

Jun. 11, 2014 (RU) .................................. 2014123802

(51) Int. Cl.
*G06F 1/26* (2006.01)
*G06F 1/28* (2006.01)

(52) U.S. Cl.
CPC ... *G06F 1/28* (2013.01); *G06F 1/26* (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10

See application file for complete search history.

(56) References Cited

U.S. PATENT DOCUMENTS

| | | | |
|---|---|---|---|
| 5,880,602 A | 3/1999 | Kaminaga et al. | |
| 6,049,227 A | 4/2000 | Goetting et al. | |
| 6,218,858 B1 | 4/2001 | Menon et al. | |
| 6,271,679 B1 | 8/2001 | McClintock et al. | |
| 6,342,802 B1 | 1/2002 | Forehand | |
| 6,346,827 B1 | 2/2002 | Yeung et al. | |
| 6,366,159 B1 | 4/2002 | Taheri | |
| 6,512,401 B2 | 1/2003 | Clark | |
| 6,714,050 B2 | 3/2004 | McClintock et al. | |
| 6,822,479 B1 | 11/2004 | Rosen | |
| 6,903,581 B2 | 6/2005 | Clark et al. | |
| 7,215,150 B2 | 5/2007 | Torres et al. | |
| 8,018,268 B1 | 9/2011 | Williams | |
| 2009/0089605 A1* | 4/2009 | Westwick | H03K 17/223 713/340 |
| 2010/0164469 A1* | 7/2010 | Bansal | G06F 1/26 323/318 |
| 2011/0022789 A1* | 1/2011 | Fujimoto | G06F 1/266 711/103 |
| 2012/0056630 A1* | 3/2012 | Itou | G01P 15/125 324/679 |
| 2014/0266387 A1* | 9/2014 | Chen | H03K 19/007 327/333 |

* cited by examiner

FOREIGN PATENT DOCUMENTS

WO 2013060137 5/2013

*Primary Examiner* — Zahid Choudhury
(74) *Attorney, Agent, or Firm* — Charles E. Bergere (57) ABSTRACT

An integrated circuit (IC) includes a first I/O cell, a logic cell, a trigger signal generation circuit, and a second I/O cell having a voltage selection pin. I/O interfaces of the first I/O cell receive first and second supply voltages, respectively, and I/O interfaces of the second I/O cell receive third and fourth supply voltages, respectively. The first I/O cell generates a first trigger signal when the first supply voltage reaches a first predetermined voltage. The logic cell receives the first trigger signal and generates a safe-state signal. The trigger signal generation circuit generates a second trigger signal when the third supply voltage reaches a second predetermined voltage. The voltage selection pin receives the safe-state signal and the second trigger signal and sets the second I/O cell in a safe-state mode, which protects the second I/O cell from over voltage damage.

19 Claims, 6 Drawing Sheets

1
INTEGRATED CIRCUIT WITH MULTI-VOLTAGE INPUT/OUTPUT (I/O) CELLS

BACKGROUND OF THE INVENTION

The present invention relates generally to integrated circuits, and, more particularly, to an input/output cell for an integrated circuit.

Integrated circuits (ICs) including system-on-chips (SoCs) integrate various digital as well as analog components on a single chip. The SoC communicates with external components such as a dynamic random access memory (DRAM) and a dual data rate (DDR) memory as well as Ethernet and universal serial data-bus (USB) physical layers and includes input/output (I/O) cells that facilitate the communication between the SoC and the external components. The I/O cells perform various I/O operations, such as driving logic signals from the SoC to the external components, receiving and conditioning input signals from the external components, and providing electrostatic protection to the SoC.

The I/O cells have input interfaces for communicating with internal logic of the SoC and output interfaces for communicating with the external components. The I/O interfaces operate at different supply voltages that are generated by a switched-mode power supply (SMPS) inside the SoC. The I/O cells are of two types: fixed I/O cells (FIO) and general purpose I/O cells (GPIO). An output interface of an FIO cell operates at a fixed voltage level and an output interface of a GPIO cell may operate at multiple voltage levels. The GPIO cells that have output interfaces operating at the same voltage level and input interfaces operating at a SoC internal voltage level together comprise a GPIO cell bank. The internal logic of the SoC operates at the SoC internal voltage level. Similarly, the FIO cells that have output interfaces operating at a fixed voltage level of the supply voltage and input interfaces operating at the SoC internal voltage level together comprise a FIO cell bank.

The GPIO cells are configured to operate in different modes based on the voltage levels (hereinafter referred to as "peak values") of the supply voltage at the corresponding output interfaces. A GPIO cell must be configured to a particular mode of operation that corresponds to a desired peak value of the supply voltage at its output interface before the supply voltage at its input interface reaches a corresponding supply detection threshold voltage level (hereinafter referred to as "GPIO_THRESHOLD"). The operation mode is determined by a logic circuit of the SoC that configures the GPIO cell to operate at the desired peak value at the output interface. The logic circuit generates binary values that correspond to the desired peak value of the supply voltage at the output interface and applies the binary values at voltage selection pins of the GPIO cell, thereby configuring the GPIO cell. The binary values must be received at the voltage selection pins of the GPIO cell before the supply voltage at the input interface of the GPIO cell reaches the GPIO_THRESHOLD.

When the SoC is powered-on, the supply voltage received at the I/O interfaces of the FIOs and GPIOs begins to ramp up from zero to the corresponding peak values, at different rates. Generally, the SoC internal voltage level is less than the voltage level at which the external components operate. Hence, the supply voltage at the input interface of the GPIO cell is less than the supply voltage at the output interface of the GPIO cell. In a generic power supply ramp-up sequence, a lower voltage is derived from a higher voltage, and hence, the higher voltage ramps up to a corresponding peak value before the lower voltage. Hence, the supply voltage at the output 2
interface of the GPIO cell reaches a corresponding peak value before the supply voltage at the input interface of the GPIO cell ramps up to the GPIO_THRESHOLD. If the GPIO cell is not configured to the required mode of operation before the supply voltage at the input interface of the GPIO cell reaches the GPIO_THRESHOLD, the GPIO cell enters a non-determinant state and may be damaged.

Figure 1:
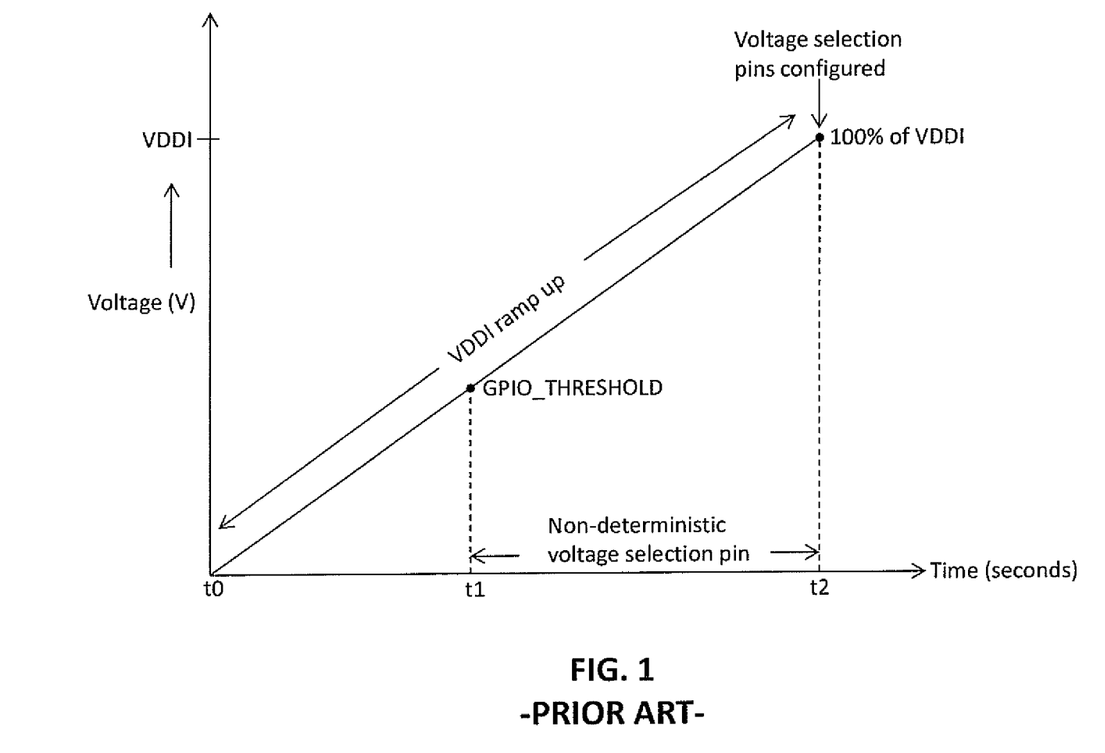
FIG. 1 is a timing diagram illustrating a generic power supply ramp-up sequence of a general purpose input/output (GPIO) cell of a system-on-chip (SoC)

FIG. 1 is a timing diagram that illustrates a generic power supply ramp-up sequence of a GPIO cell of the SoC. The input interface of the GPIO cell receives a first supply voltage VDDI from the SMPS and the output interface of the GPIO cell receives a second supply voltage IOVDD from the SMPS. At time t0, the SoC is powered on and the first supply voltage VDDI begins ramping up to the corresponding peak value. From time t0-t1, VDDI is less than the GPIO_THRESHOLD, hence, the GPIO cell is in the tri-state mode. The second supply voltage IOVDD ramps up faster than the first supply voltage VDDI due to the generic power supply ramp-up sequence, so the first supply voltage VDDI continues to ramp up when the second supply voltage IOVDD has reached its corresponding peak value. At time t1, the first supply voltage VDDI reaches the GPIO_THRESHOLD and the GPIO cell exits the tri-state mode. However, at time t1, the mode of operation of the GPIO cell for the desired peak value of the second supply voltage IOVDD has not yet been configured. At time t2, the first supply voltage VDDI reaches the corresponding peak value and the mode of operation of the GPIO cell gets configured. Hence, from time t1-t2, the GPIO cell is in the non-determinant state and prone to damage.

Several techniques may be used to overcome the above-mentioned problem. One technique is to implement dedicated SoC pads on the board on which the SoC is mounted. The binary values corresponding to the desired peak value of the second supply voltage IOVDD are sampled directly from the SoC pads to the voltage selection pins of the GPIO cells of the GPIO bank. Thus, the GPIO cells are configured when the first supply voltage VDDI is ramping up (and is less than the GPIO_THRESHOLD). However, the voltage selection pins of the GPIO cells in each GPIO bank require dedicated SoC pads, thereby increasing area and cost of the SoC. For example, if the SoC has five GPIO banks and the GPIO cells in each bank have three voltage selection pins, fifteen pads are needed to set the voltage selection pins and configure the GPIO cells.

Another technique is to implement a specific power supply ramp-up sequence (also referred to as power sequencing) that mandates the first supply voltage VDDI ramp up to the GPIO_THRESHOLD before the second supply voltage IOVDD ramps up to the corresponding peak value, which results in setting the voltage selection pins before the first supply voltage VDDI reaches the GPIO_THRESHOLD, which prevents damage to the GPIO cell. However, specialized power regulators for regulating the ramp-up time of the first and second supply voltages VDDI and IOVDD are required to implement the specific power supply ramp-up sequence, which further increases cost and design complexity of the board on which the SoC is mounted.

Therefore, it would be advantageous to have a system for protecting an I/O cell of a SoC, and that configures the I/O cell in a desired mode of operation before the supply voltage at an input interface of the I/O cell reaches a corresponding supply detection threshold voltage level.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, an integrated circuit (IC) such as a system-on-chip (SoC), comprises a first input/output (I/O) cell, a logic cell, a trigger signal generation circuit, and a second I/O cell. The first I/O cell has an input interface for receiving a first supply voltage and an output interface for receiving a second supply voltage. The first I/O cell generates a first trigger signal when the first supply voltage reaches a first predetermined voltage. The SoC logic cell receives the first trigger signal and outputs a safe-state signal. The SoC circuit receives a third supply voltage and outputs a second trigger signal when the third supply voltage reaches a second predetermined voltage. The second I/O cell has an input interface for receiving the third supply voltage, an output interface for receiving a fourth supply voltage, and a voltage selection pin connected to the SoC logic cell and the SoC circuit by way of a logic gate for receiving the safe-state signal and the second trigger signal, respectively. The voltage selection pin sets the second I/O cell in a safe-state mode.

In another embodiment of the present invention, a method for configuring an IC, such as a SoC, in a safe-state mode, is provided. The SoC includes a first I/O cell, a SoC logic cell, a SoC circuit, and a second I/O cell. The first I/O cell has input and output interfaces for receiving first and second supply voltages, respectively. The second I/O cell has input and output interfaces for receiving third and fourth supply voltages, respectively. The second I/O cell includes a voltage selection pin. The method includes generating a first trigger signal by the first I/O cell when the first supply voltage reaches a first predetermined voltage. A safe-state signal is outputted by the SoC logic cell based on the first trigger signal. A second trigger signal is generated by the SoC circuit when the third supply voltage reaches a second predetermined voltage. The safe-state signal and the second trigger signal are received by the voltage selection pin by way of a logic gate. The second I/O cell is set in the safe-state mode when the voltage selection pin receives the safe-state signal.

Various embodiments of the present invention provide a system-on-chip (SoC) that includes a first I/O cell, a SoC logic cell, a SoC circuit, and an I/O cell bank. The I/O cell bank includes a plurality of I/O cells including a second I/O cell. The second I/O cell includes a voltage selection pin. Input interfaces of the first and second I/O cells communicate with internal logic of the SoC and output interfaces thereof communicate with components external to the SoC. The input interface of the first I/O cell receives a first supply voltage having a first peak value and the output interface of the first I/O cell receives a second supply voltage having a second peak value from a switched-mode-power-supply (SMPS). The input interface of the second I/O cell receives a third supply voltage having a third peak value and the output interface of the second I/O cell receives a fourth supply voltage having multiple peak values from the SMPS. When the SoC is powered on, the first through fourth supply voltages begin ramping up to the corresponding peak values according to a generic power supply ramp-up sequence in which a higher voltage ramps up faster than a lower voltage. When the first supply voltage is less than a first predetermined voltage, the first I/O cell is in a tri-state mode and when the third supply voltage is less than a second predetermined voltage the second I/O cell is in the tri-state mode. When the first supply voltage reaches the first predetermined voltage, the first I/O cell is active and generates a first trigger signal. The SoC logic cell receives the first trigger signal and generates a safe-state signal. The SoC circuit receives and compares the third supply voltage with the second predetermined voltage and generates a second trigger signal when the third supply voltage reaches the second predetermined voltage.

The voltage selection pin of the second I/O cell receives the second trigger signal and the safe-state signal by way of a logic gate, which sets the second I/O cell and each I/O cell of the I/O cell bank into a safe-state mode. Hence, the system of the present invention protects the second I/O cell from damages by configuring the second I/O cell in to the safe-state mode when the third supply voltage reaches the second predetermined voltage and the second I/O cell is active and eliminates the need for dedicated SoC pads for providing binary values to the voltage selection pin. Further, the system of the present invention does not require specialized power regulators for power sequencing of the first through fourth supply voltages, thereby reducing cost of production and design complexity.

Figure 2:
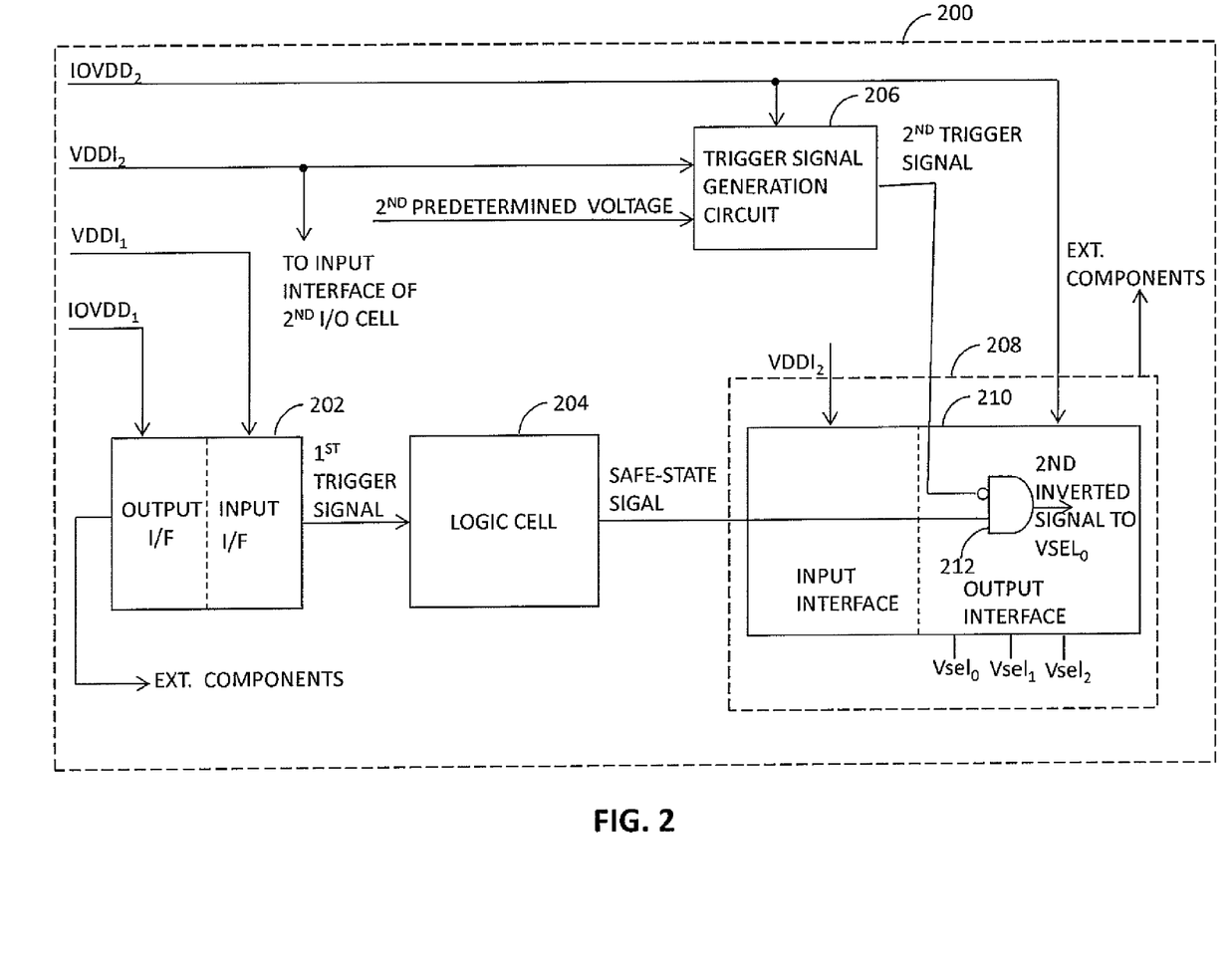
FIG. 2 is a schematic block diagram of a system-on-chip (SoC) in accordance with an embodiment of the present invention.

Referring now to FIG. 2, a schematic block diagram of a system-on-chip (SoC) 200 in accordance with an embodiment of the present invention is shown. The SoC 200 includes a first I/O cell 202, a SoC logic cell 204, a SoC circuit 206, and an I/O cell bank 208. The I/O cell bank 208 includes a plurality of I/O cells including a second I/O cell 210. The second I/O cell 210 includes a logic gate 212.

An input interface of the first I/O cell 202 is connected to a switched-mode power supply (SMPS, not shown) for receiving a first supply voltage $VDDI_1$ having a first peak value and generates a first trigger signal. An output interface of the first I/O cell 202 is connected to components (not shown) external to the SoC 200 such as a dynamic random access memory (DRAM) and a dual data rate memory as well as Ethernet and universal serial data-bus (USB) physical layers. The output interface of the first I/O cell 202 is further connected to the SMPS for receiving a second supply voltage $IOVDD_1$ having a second peak value. The first and second peak values represent the operating voltage levels of the input and output interfaces of the first I/O cell 202. When the first supply voltage $VDDI_1$ is below a corresponding supply detection threshold voltage level or the second supply voltage $IOVDD_1$ has not reached a desired peak value, the first I/O cell 202 is in a tri-state mode. When the first supply voltage $VDDI_1$ reaches a first predetermined voltage (the supply detection threshold voltage level of the first supply voltage $VDDI_1$, hereinafter referred to as "FIO_THRESHOLD") and the second supply voltage $IOVDD_1$ reaches the desired peak value, the first I/O cell 202 is in an active state.

The SoC logic cell 204 is connected to the input interface of the first I/O cell 202 for receiving the first trigger signal and generates a safe-state signal. The SoC circuit 206 is connected to the SMPS for receiving a third supply voltage $VDDI_2$ having a third peak value and generates a second trigger signal based on a comparison between the third supply voltage $VDDI_2$ and a second predetermined voltage (hereinafter referred to as "GPIO_THRESHOLD").

The second I/O cell 210 has an input interface connected to the SMPS for receiving the third supply voltage $VDDI_2$ and an output interface connected to the external components and the SMPS for receiving a fourth supply voltage $IOVDD_2$ that may have multiple peak values. The logic gate 212 has an inverting input terminal connected to the SoC circuit 206 for receiving the second trigger signal, a non-inverting input terminal connected to the SoC logic cell 204 for receiving the safe-state signal, and an output terminal connected to a first voltage selection pin of a plurality of voltage selection pins of the second I/O cell 210 for outputting the safe-state signal based on the second trigger signal. In one embodiment, the logic gate 212 is an AND gate. Input and output interfaces of each I/O cell of the I/O cell bank 208 receive the third supply voltage $VDDI_2$ having the third peak value and the fourth supply voltage $IOVDD_2$ having a desired peak value from among the multiple peak values, respectively. The third peak value and the desired peak value correspond to the operating voltage levels of the input and output interfaces of each I/O cell of the I/O cell bank 208. The fourth supply voltage $IOVDD_2$ is greater than the third supply voltage $VDDI_2$ and reaches the desired peak value before the third supply voltage $VDDI_2$ reaches the third peak value, based on a generic power supply ramp-up sequence in which a higher voltage ramps up faster than a lower voltage.

The plurality of voltage selection pins of the second I/O cell 210 are configured according to the desired peak value of the fourth supply voltage $IOVDD_2$. In ne embodiment of the present invention, the plurality of voltage selection pins includes first through third voltage selection pins $Vsel_0$, $Vsel_1$, and $Vsel_2$. Each voltage selection pin receives a binary value. Binary values corresponding to the plurality of voltage selection pins form a binary code that represents a mode of operation of each I/O cell of the I/O cell bank 208 including the second I/O cell 210. The first voltage selection pin $Vsel_0$ corresponds to a most-significant-bit (MSB) of the binary code and the third voltage selection pin $Vsel_2$ corresponds to a least-significant-bit (LSB) of the binary code. The mode of operation of the second I/O cell 210 corresponds to the desired peak value of the fourth supply voltage $IOVDD_2$. Exemplary modes of operation of the second I/O cell 210 based on the binary values received at the first through third voltage selection pins $Vsel_0$, $Vsel_1$, and $Vsel_2$ are shown in Table A.

TABLE A

Modes of operation of the second I/O cell 210

| $Vsel_0$ | $Vsel_1$ | $Vsel_2$ | Mode (Desired peak value) |
|---|---|---|---|
| 0 | X | X | Auto-detect |
| 1 | 0 | 0 | 3.3 V |
| 1 | 0 | 1 | 2.5 V |
| 1 | 1 | 0 | 2.5 V |
| 1 | 1 | 1 | 1.8 V |

When the third supply voltage $VDDI_2$ is below the corresponding supply-detection threshold voltage level (i.e. the second predetermined voltage, GPIO_THRESHOLD) and the fourth supply voltage $IOVDD_2$ is yet to reach the desired peak value, the second I/O cell 210 is in the tri-state mode. When the third supply voltage $VDDI_2$ reaches the GPIO_THRESHOLD and the fourth supply voltage $IOVDD_2$ reaches the desired peak value, the second I/O cell 210 is active. The second I/O cell 210 needs to be configured in to a mode of operation that corresponds to the desired peak value the fourth supply voltage $IOVDD_2$. When the first voltage selection pin $Vsel_0$ receives a binary value of zero, the second I/O cell 210 is configured to operate in a safe-state or the auto-detect mode (as shown in table A). When the first voltage selection pin $Vsel_0$ receives a binary value of one, the second and third voltage selection pins $Vsel_1$ and $Vsel_2$ receive binary values corresponding to the desired peak value of the fourth supply voltage $IOVDD_2$ (as shown in table A). In an example, if the desired peak value is 3.3 volts, then the first voltage selection pin $Vsel_0$ receives a binary one, the second voltage selection pin $Vsel_1$ receives a binary zero, and the third voltage selection pin $Vsel_2$ receives a binary zero and configures the second I/O cell 210 according to the desired peak value of 3.3 volts. In another example, if the first voltage selection pin $Vsel_0$ receives a binary one, the second voltage selection pin $Vsel_1$ receives a binary one and the third voltage selection pin $Vsel_2$ receives a binary one, the second I/O cell 210 is configured to the desired peak value of 1.8 volts of the fourth supply voltage $IOVDD_2$. In an embodiment of the present invention, the plurality of I/O cells of the I/O cell bank 208 including the second I/O cell 210 are general purpose I/O (GPIO) cells and the first I/O cell 202 is at least one of the FIO and GPIO cells with the first, second, and third voltage selection pins $Vsel_0$, $Vsel_1$, and $Vsel_2$ receiving binary ones.

In operation, when the SoC 200 is powered on, the first, second, third, and fourth supply voltages $VDDI_1$, $IOVDD_1$, $VDDI_2$, and $IOVDD_2$ start ramping up from zero to respective peak values based on the generic power supply ramp-up sequence. When the first supply voltage $VDDI_1$ is less than the FIO_THRESHOLD, the first I/O cell is in the tri-state mode. When the first supply voltage $VDDI_1$ reaches the FIO_THRESHOLD, the first I/O cell 202 is active and generates the first trigger signal. The SoC logic cell 204 receives the first trigger signal and generates the safe-state signal which is at logic low state. In an embodiment of the present invention, the SoC logic cell 204 includes low-voltage-threshold (LVT) cells that are functional when a SoC internal voltage received from the SMPS is very low. Internal logic of the SoC operates at the SoC internal voltage level. The LVT cells detect the first trigger signal and generate the safe-state signal at logic low state.

The SoC circuit 206 receives and compares the third supply voltage $VDDI_2$ with the GPIO_THRESHOLD. When the third supply voltage $VDDI_2$ is less than the GPIO_THRESHOLD, the SoC circuit 206 generates the second trigger signal at logic high state. Since, the inverting input terminal of the logic gate 212 receives the second trigger signal at logic high state, the logic gate 212 outputs a logic low signal to the first voltage selection pin $Vsel_0$, independent of a logic state of the safe-state signal. However, since the third supply voltage $VDDI_2$ is less than the GPIO_THRESHOLD, the second I/O cell 210 is in the tri-state mode.

When the third supply voltage $VDDI_2$ reaches the GPIO_THRESHOLD, the second I/O cell 210 is activated. The SoC circuit 206 generates the second trigger signal that is in a logic low state. Since the inverting input terminal of the logic gate 212 receives the second trigger signal which is at logic low state, the logic low safe-state signal propagates through the logic gate 212 to the first voltage selection pin $Vsel_0$. Upon receiving the safe-state signal at logic low state, the first voltage selection pin $Vsel_0$ configures the second I/O cell 210 and other I/O cells of the I/O cell bank 208 in the safe-state mode (as shown in Table A). When the second I/O cell 210 is configured in the safe-state mode, the second and third voltage selection pins $Vsel_1$ and $Vsel_2$ are configured based on the desired peak value of the fourth supply voltage $IOVDD_2$, as shown in table A. Hence, when the fourth supply voltage $IOVDD_2$ reaches the desired peak value while the third supply voltage $VDDI_2$ is still ramping up, the system of the present invention configures the second I/O cell 210 in the safe-state mode to protect the second I/O cell 210 from any damages.

The FIO_THRESHOLD needs to be less than the GPIO_THRESHOLD to enable the propagation of the logic low safe-state signal to the non-inverting terminal of the logic gate 212 when the third supply voltage $VDDI_2$ is less than the GPIO_THRESHOLD, i.e., when the second I/O cell 210 is in the tri-state mode. To satisfy the above-mentioned condition, the FIO_THRESHOLD is determined by using the equation (1) below (taking into consideration a 10% delay margin for propagation of the safe-state signal in a logic low state):

FIO_THRESHOLD≤GPIO_THRESHOLD (volts)−(1.1* highest power supply ramp-up rate (volts/milliseconds)

*highest delay in propagation of the safe-state signal from the input interface of the first I/O cell 202 to the input interface of the second I/O cell 210

(milliseconds)) (1)

Additionally, the FIO_THRESHOLD is determined to be greater than a voltage z volt at which the highest delay in the propagation of the safe-state signal is calculated, i.e., FIO_THRESHOLD≥z. Moreover, the GPIO_THRESHOLD cannot be greater than the third peak value of the third supply voltage $VDDI_2$, and hence is determined by using the equation (2) below (taking into consideration a ten percent IR drop margin in the SoC 200):

GPIO_THRESHOLD (volts)≤minimum voltage supplied by the SMPS to the SoC 200 (volts)−1.1*maximum IR drop in the SoC 200 (volts) (2)

Figure 3:
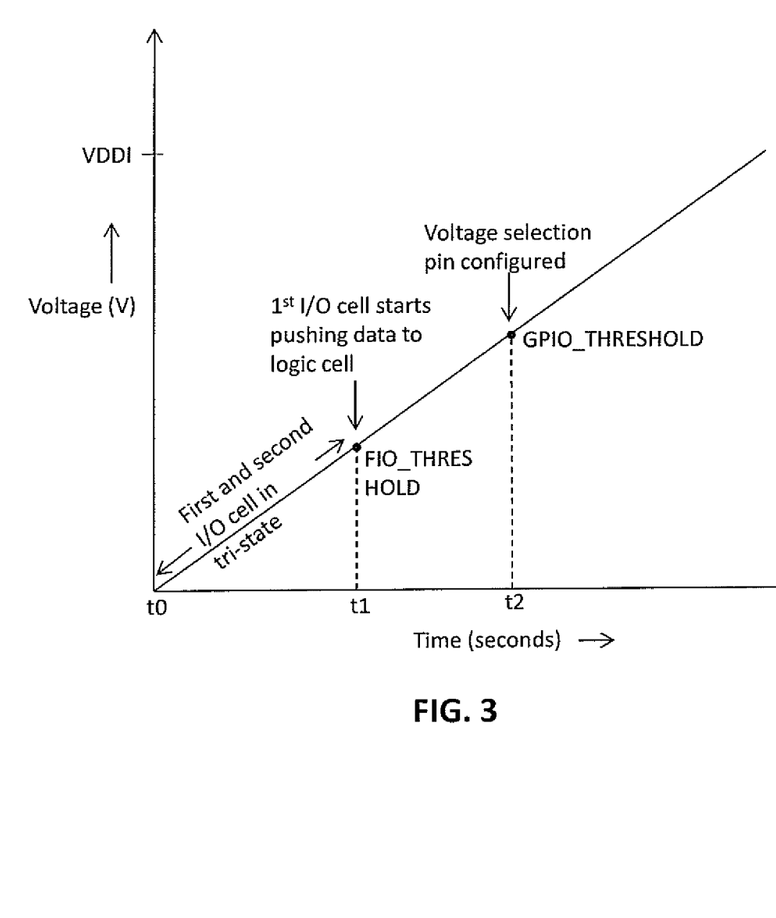
FIG. 3 is an exemplary timing diagram illustrating a power supply ramp-up sequence of a second I/O cell of the SoC of FIG. 2, in accordance with an embodiment of the present invention.

FIG. 3 shows an exemplary timing diagram illustrating the generic power supply ramp-up sequence of the second I/O cell 210 in accordance with an embodiment of the present invention. The third supply voltage $VDDI_2$ received at the input interface of the second I/O cell 210 equals the first supply voltage $VDDI_1$ received at the input interface of the first I/O cell 202, i.e., $VDDI_1=VDDI_2=VDDI$, and hence, the third peak value of the third supply voltage VDDI is equal to the first peak value of the first supply voltage VDDI.

At time instance t0, the first and third supply voltages VDDI begin to ramp up. During the time period t0-t1, the first and third supply voltages VDDI are less than the FIO_THRESHOLD and GPIO_THRESHOLD, respectively. As a result, the first and second I/O cells 202 and 210 are set in the tri-state mode. The SoC circuit 206 generates the second trigger signal, which is at logic high state. When the inverting input terminal of the logic gate 212 receives the logic high second trigger signal, the logic gate 212 outputs a logic low signal to the first voltage selection pin $Vsel_0$ independent of a logic state of the safe-state signal.

At time instance t1, the first supply voltage VDDI reaches the FIO_THRESHOLD thereby activating the first I/O cell 202. The first I/O cell 202 generates the first trigger signal. The SoC logic cell 204 receives the first trigger signal and generates the safe-state signal in logic low state. Since, during the time period t1-t2, the third supply voltage VDDI is less than the GPIO_THRESHOLD, the second I/O cell 210 is in the tri-state mode.

At time instance t2, the third supply voltage VDDI reaches the GPIO_THRESHOLD, thereby activating the second I/O cell 210. Since the third supply voltage VDDI reaches the GPIO_THRESHOLD, the second trigger signal toggles from logic high state to logic low state. As a result, the safe-state signal propagates through the logic gate 212 to the first voltage selection pin $Vsel_0$. Hence, the second I/O cell 210 is configured in the safe-state mode at time instance t2 when the third supply voltage reaches the GPIO_THRESHOLD.

Figure 4:
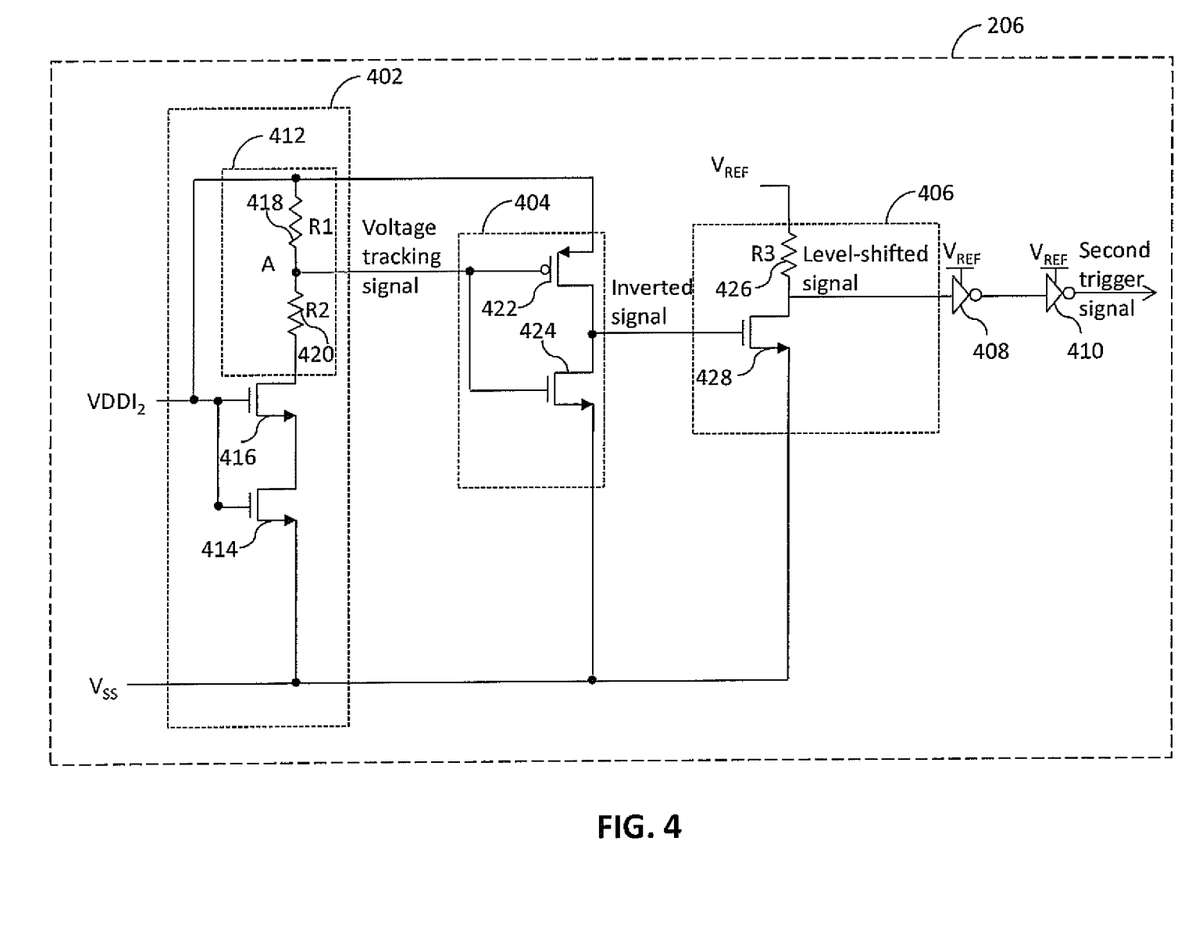
FIG. 4 is a schematic circuit diagram of a trigger signal generation circuit of the SoC of FIG. 2 in accordance with an embodiment of the present invention.

Referring now to FIG. 4, a schematic circuit diagram of the SoC circuit 206 in accordance with an embodiment of the present invention is shown. The SoC circuit 206 includes a voltage tracking circuit 402, a first inverter circuit 404, a level-shifter circuit 406 and first and second NOT gates 408 and 410.

The voltage-tracking circuit 402 includes a resistor-ladder circuit 412 and first and second transistors 414 and 416. The resistor-ladder circuit 412 includes a plurality of resistors that includes first and second resistors 418 and 420. The first transistor 414 has a source terminal connected to the SMPS for receiving a low supply voltage $V_{SS}$, and a gate terminal connected to the SMPS for receiving the third supply voltage $VDDI_2$. The second transistor 416 has a gate terminal connected to the gate terminal of the first transistor 414 for receiving the third supply voltage $VDDI_2$, and a source terminal connected to a drain terminal of the first transistor 414. The second resistor 420 is connected between a drain terminal of the second transistor 416 and an intermediate node A (hereinafter referred to as "node A") of the resistor ladder circuit 412. The first resistor 418 is connected between the gate terminal of the first transistor 414 and the node A. The node A outputs a voltage tracking signal. In an embodiment of the present invention, a voltage at the node A is controlled by changing the size of the first and second transistors 414 and 416.

The first inverter circuit 404 includes third and fourth transistors 422 and 424. The third transistor 422 has a source terminal connected to the gate terminal of the second transistor 416 for receiving the third supply voltage $VDDI_2$ and a gate terminal connected to the node A for receiving the voltage tracking signal. The fourth transistor 424 has a source terminal connected to the SMPS for receiving the low supply voltage $V_{SS}$, a gate terminal connected to the gate terminal of the third transistor 422 for receiving the voltage tracking signal, and a drain terminal connected to a drain terminal of the third transistor 422 for outputting an inverted signal. The inverted signal is a digital representation of the voltage-tracking signal.

The level-shifter circuit 406 includes a third resistor 426 and a fifth transistor 428. The fifth transistor 428 has a source terminal connected to the SMPS for receiving the low supply voltage $V_{SS}$, a gate terminal connected to the drain terminals of the third and fourth transistors 422 and 424 for receiving the inverted signal, and a drain terminal connected to the SMPS by way of the third resistor 426 for receiving a fifth supply voltage $V_{REF}$ and outputting a level-shifted signal. The gate terminal of the fifth transistor 428 receives the inverted signal at a voltage level of the third supply voltage $VDDI_2$ and the drain terminal thereof outputs the level-shifted signal at a voltage level of the fifth supply voltage $V_{REF}$ and hence, the level-shifted signal is independent of the ramping of the third supply voltage $VDDI_2$. Hence, the level-shifter circuit 406 decouples the level-shifted signal from the third supply voltage $VDDI_2$.

An input terminal of the first NOT gate 408 is connected to the drain terminal of the fifth transistor 428 for receiving the level-shifted signal and an output terminal of the first NOT gate 408 outputs an inverted level-shifted signal. An input terminal of the second NOT gate 410 is connected to the output terminal of the first NOT gate 408 for receiving the inverted level-shifted signal and an output terminal of the second NOT gate 410 outputs the second trigger signal. Supply voltage terminals of the first and second NOT gates 408 and 410 receive the fifth supply voltage $V_{REF}$. In an embodiment of the present invention, the low supply voltage $V_{SS}$ is at ground, the first, second, fourth and fifth transistors 414, 416, 424, and 428 are n-channel metal-oxide semiconductor (NMOS) transistors and the third transistor 422 is a p-channel metal-oxide semiconductor (PMOS) transistor.

When the third supply voltage $VDDI_2$ is less than the GPIO_THRESHOLD, the first and second transistors 414 and 416 are switched off. Thus, the second resistor 420 along with the first and second transistors 414 and 416 forms a resistive network and provides a high resistance at the node A. Hence, a voltage at the node A equals the third supply voltage $VDDI_2$ and henceforth the node A tracks the third supply voltage $VDDI_2$. As a result, the voltage-tracking signal is generated which is at logic high state. When the voltage-tracking signal is at logic high state, the fourth transistor 424 is switched on and the third transistor 422 is switched off, thereby outputting the inverted signal at logic low state. The gate terminal of the fifth transistor 428 receives the inverted signal at logic low state and the drain terminal thereof outputs the level-shifted signal at logic high state. The first NOT gate 408 inverts the level-shifted signal at logic high state and outputs the inverted level-shifted signal at logic low state. The second NOT gate 410 receives the inverted level-shifted signal at logic low state and outputs the second trigger signal at logic high state at the output terminal thereof.

When the third supply voltage $VDDI_2$ reaches the GPIO_THRESHOLD, the first and second transistors 414 and 416 are switched on and hence, have low resistances. As a result, the voltage at the node A drops, thereby generating the voltage-tracking signal at logic low state. When the voltage-tracking signal is at logic low state, the third transistor 422 is switched on and the fourth transistor 424 is switched off, thereby outputting the inverted signal at logic high state. The gate terminal of the fifth transistor 428 receives the inverted signal at logic high state and the drain terminal thereof outputs the level-shifted signal at logic low state. The first NOT gate 408 inverts the level-shifted signal at logic low state and outputs the inverted level-shifted signal at logic high state. The second NOT gate 410 receives the inverted level-shifted signal at logic high state and outputs the second trigger signal at logic low state at the output terminal thereof.

Figure 5:
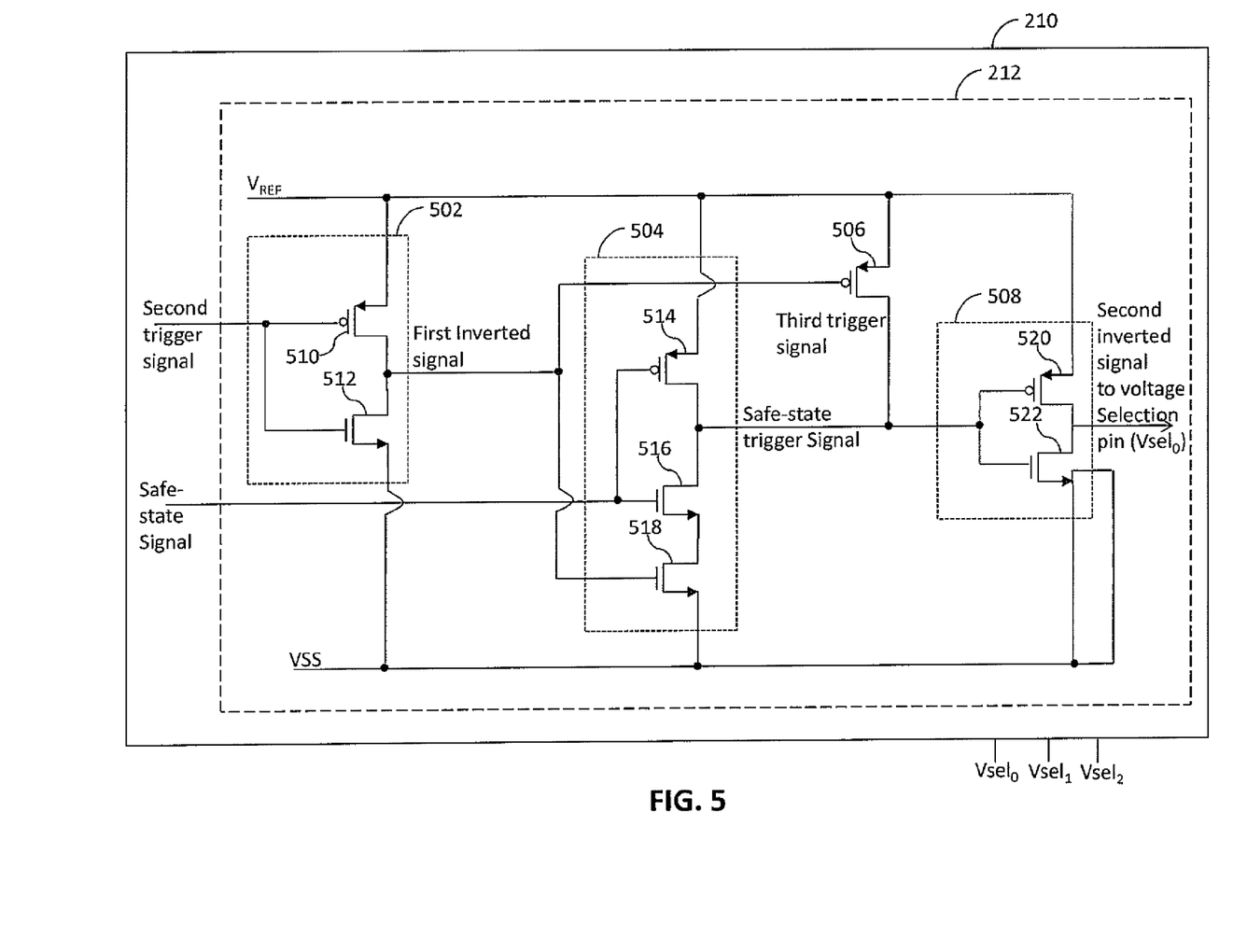
FIG. 5 is a schematic circuit diagram of the second I/O cell of the SoC of FIG. 2 in accordance with an embodiment of the present invention.

Referring now to FIG. 5, a schematic circuit diagram of the second I/O cell 210 in accordance with an embodiment of the present invention is shown. The logic gate 212 of the second I/O cell 210 includes a second inverter circuit 502, a bypass circuit 504, a sixth transistor 506, and a third inverter circuit 508.

The second inverter circuit 502 includes seventh and eighth transistors 510 and 512. The seventh transistor 510 has a source terminal connected to the SMPS for receiving the fifth supply voltage $V_{REF}$ and a gate terminal connected to the output terminal of the second NOT gate 410 for receiving the second trigger signal. The eighth transistor 512 has a source terminal connected to the SMPS for receiving the low supply voltage $V_{SS}$, a gate terminal connected to the gate terminal of the seventh transistor 510 for receiving the second trigger signal and a drain terminal connected to a drain terminal of the seventh transistor 510 for outputting a first inverted signal.

The bypass circuit 504 includes ninth through eleventh transistors 514-518. The ninth transistor 514 has a source terminal connected to the SMPS for receiving the fifth supply voltage $V_{REF}$ and a gate terminal connected to the SoC logic cell 204 for receiving the safe-state signal. The tenth transistor 516 has a gate terminal connected to the gate terminal of the ninth transistor 514 for receiving the safe-state signal, and a drain terminal connected to a drain terminal of the ninth transistor 514 for generating a safe-state trigger signal. The eleventh transistor 518 has a source terminal connected to the SMPS for receiving the low supply voltage $V_{SS}$, a gate terminal connected to the drain terminals of the seventh and eighth transistors 510 and 512 for receiving the first inverted signal, and a drain terminal connected to a source terminal of the tenth transistor 516.

The sixth transistor 506 has a source terminal connected to the SMPS for receiving the fifth supply voltage $V_{REF}$, a gate terminal connected to the gate terminal of the eleventh transistor 518 and the drain terminals of the seventh and eighth transistors 510 and 512 for receiving the first inverted signal, and a drain terminal connected to the drain terminals of the ninth and tenth transistors 514 and 516 for generating a third trigger signal.

The third inverter circuit 508 includes twelfth and thirteenth transistors 520 and 522. The twelfth transistor 520 has a source terminal connected to the SMPS for receiving the fifth supply voltage $V_{REF}$ and a gate terminal connected to the drain terminals of the sixth, ninth and tenth transistors 506, 514, and 516 for receiving at least one of the safe-state trigger and third trigger signals. The thirteenth transistor 522 has a gate terminal connected to the gate terminal of the twelfth transistor 520 for receiving at least one of the safe-state trigger and third trigger signals, a source terminal connected to the SMPS for receiving the low supply voltage $V_{SS}$, and a drain terminal connected to a drain terminal of the twelfth transistor 520 for outputting a second inverted signal to the first voltage selection pin $Vsel_0$. In an embodiment of the present invention, the sixth, seventh, ninth and twelfth transistors 506, 510, 514, and 520 are PMOS transistors and eighth, tenth, eleventh, and thirteenth transistors 512, 516, 518, and 522 are NMOS transistors.

In operation, when the third supply voltage $VDDI_2$ is less than the GPIO_THRESHOLD, the second trigger signal generated by the SoC circuit 206 is at logic high state. As a result, the seventh transistor 510 is switched off as the gate terminal thereof is at logic high state and the eighth transistor 512 is switched on as the gate terminal thereof is at logic high state. Hence, the logic high second trigger signal is inverted and outputted as logic low first inverted signal at the drain terminals of the seventh and eighth transistors 510 and 512. The sixth transistor 506 is switched on when the gate terminal thereof receives the first inverted signal at logic low state and the drain terminal thereof generates the third trigger signal at logic high state. As a result, the twelfth transistor 520 is switched off as the gate terminal thereof is at a logic high state and the thirteenth transistor 522 is switched on as the gate terminal thereof is at a logic high state. Hence, the logic high third trigger signal is inverted and outputted as the logic low second inverted signal at the drain terminals of the twelfth and thirteenth transistors 520 and 522. The first voltage selection pin $Vsel_0$ receives the second inverted signal at logic low state. However, since the third supply voltage $VDDI_2$ is less than the GPIO_THRESHOLD, the second I/O cell 210 continues to remain in the tri-state mode.

When the third supply voltage $VDDI_2$ reaches the GPIO_THRESHOLD, the second trigger signal generated by the SoC circuit 206 is at logic low state. As a result, the seventh transistor 510 is switched on as the gate terminal thereof is at a logic low state and the eighth transistor 512 is switched off as the gate terminal thereof is at a logic low state. Hence, the logic low second trigger signal is inverted and outputted as logic high first inverted signal at the drain terminals of the seventh and eighth transistors 510 and 512. The sixth transistor 506 is switched off when the gate terminal thereof receives the first inverted signal at logic high state. The eleventh transistor 518 is switched on when the gate terminal thereof receives the first inverted signal at logic high state, thereby activating the bypass circuit 504. Since, the GPIO_THRESHOLD is calculated to be greater than the FIO_THRESHOLD (as discussed in the equations 1 and 2), the safe-state signal at logic low state propagates to the gate terminals of the ninth and tenth transistors 514 and 516 before the third supply voltage $VDDI_2$ reaches the GPIO_THRESHOLD. As a result, the ninth transistor 514 is switched on and the tenth transistor 516 is switched off. Hence, the logic low safe-state signal is inverted and outputted as logic high safe-state trigger signal at the drain terminals of the ninth and tenth transistors 514 and 516. The gate terminal of the twelfth transistor 520 receives the safe-state trigger signal at logic high state, and the twelfth transistor 520 is switched off. The gate terminal of the thirteenth transistor 522 receives the safe-state trigger signal at logic high state, and the thirteenth transistor 522 is switched on. Hence, the safe-state trigger signal at logic high state is inverted and outputted as the second inverted signal at logic low state at the drain terminals of the twelfth and thirteenth transistors 520 and 522. When the first voltage selection pin $Vsel_0$ receives the second inverted signal at logic low state, the second I/O cell and other I/O cells of the I/O cell bank 208 are set in the safe-state mode. Once the third and fourth supply voltages $VDDI_2$ and $IOVDD_2$ reach the corresponding peak values when the second I/O cell 210 and other I/O cells of the I/O cell bank 208 are set in the safe-state mode, the second and third voltage selection pins $Vsel_1$ and $Vsel_2$ are set according to the desired peak value of the fourth supply voltage $IOVDD_2$, as shown in table A.

Figure 6:
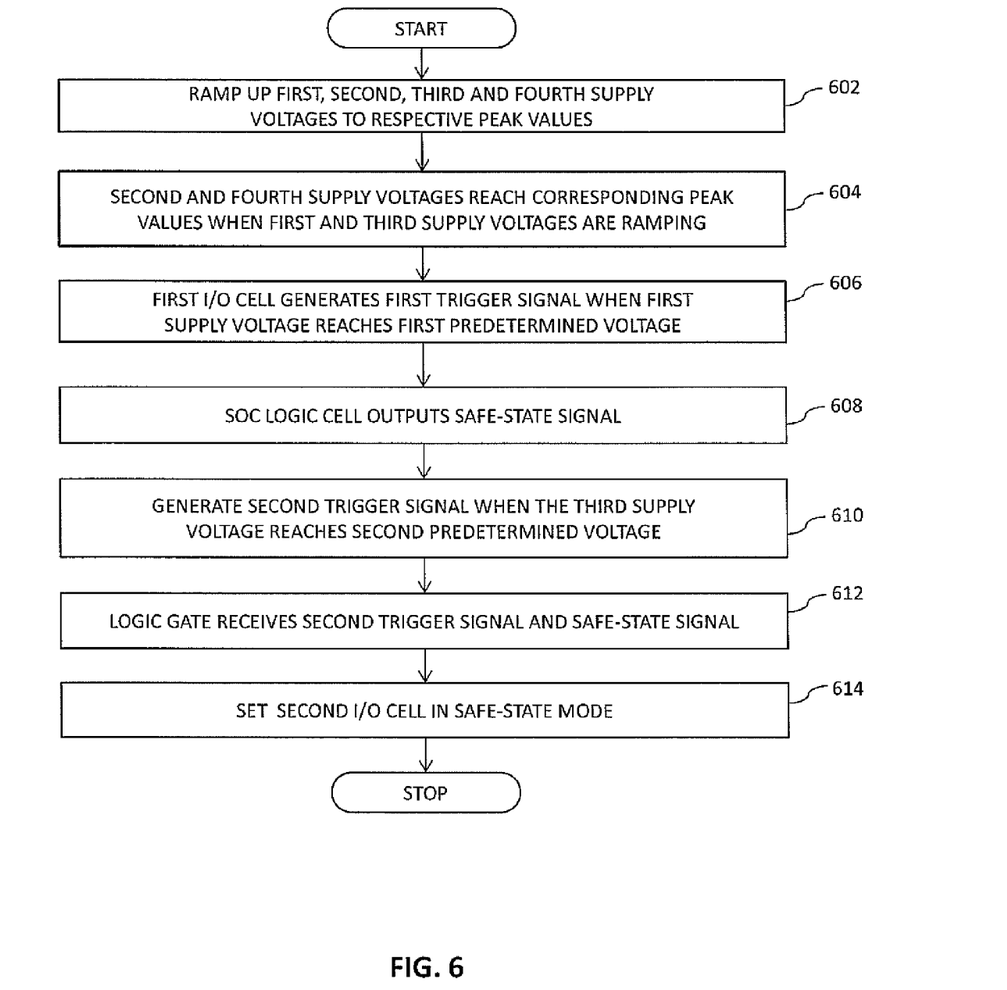
FIG. 6 is a flow chart illustrating a method for setting the second I/O cell of FIG. 5 in a safe-state mode in accordance with an embodiment of the present invention.

Referring now to FIG. 6, a flow chart illustrating a method for setting the second I/O cell 210 in the safe-state mode, in accordance with an embodiment of the present invention is shown. At step 602, the first, second, third and fourth supply voltages $VDDI_1$, $IOVDD_1$, $VDDI_2$ and $IOVDD_2$ begin ramping up to corresponding peak values according to the generic power supply ramp-up sequence. At step 604, the second and fourth supply voltages $IOVDD_1$ and $IOVDD_2$ reach the corresponding peak values and the first and third supply voltages $VDDI_1$ and $VDDI_2$ continue to ramp up to the corresponding peak value. At step 606, the first I/O cell 202 generates the first trigger signal when the first supply voltage $VDDI_2$ reaches the FIO_THRESHOLD. At step 608, the SoC logic cell 204 outputs the safe-state signal at logic low state based on the first trigger signal. At step 610, the SoC circuit 206 generates the second trigger signal at logic low state when the third supply voltage $VDDI_2$ reaches the GPIO_THRESHOLD. At step 612, the second I/O cell 210 receives the safe-state signal and the second trigger signal at logic low states by way of the logic gate 212. At step 614, the first voltage selection pin $Vsel_0$ receives the safe-state signal at logic low state and configures the second I/O cell 210 and other I/O cells of the I/O cell bank 208 in the safe-state mode.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An integrated circuit (IC), comprising:
   a first input/output (I/O) cell that has an input interface for receiving a first supply voltage, an output interface for receiving a second supply voltage, and means for generating a first trigger signal when the first supply voltage reaches a first predetermined voltage;
   a logic cell connected to the first I/O cell for receiving the first trigger signal, and outputting a safe-state signal;
   a trigger signal generation circuit for receiving a third supply voltage and outputting a second trigger signal when the third supply voltage reaches a second predetermined voltage; and
   a second I/O cell, connected to the trigger signal generation circuit, that has an input interface for receiving the third supply voltage, an output interface for receiving a fourth supply voltage, a logic gate that receives the safe-state signal and the second trigger signal, and a voltage selection pin connected to an output of the logic gate for setting the second I/O cell in a safe-state mode.

2. The IC of claim 1, wherein the trigger signal generation circuit comprises:
   a voltage-tracking circuit for receiving and tracking the third supply voltage and generating a voltage-tracking signal when the third supply voltage reaches the second predetermined voltage;
   an inverter circuit, connected to the voltage-tracking circuit, for receiving the voltage-tracking signal and generating an inverted tracking signal;
   a level-shifter, connected to the inverter circuit, for receiving the inverted tracking signal and shifting a voltage level of the inverted tracking signal from the third voltage supply level to a fifth voltage supply level to generate a level-shifted tracking signal; and
   a plurality of NOT gates connected in series for receiving the level-shifted tracking signal and generating the second trigger signal.

3. The IC of claim 2, wherein the voltage-tracking circuit comprises:
   a first transistor having a source terminal connected to ground, and a gate terminal for receiving the third supply voltage;
   a second transistor having a source terminal connected to a drain terminal of the first transistor, and a gate terminal connected to the gate terminal of the first transistor for receiving the third supply voltage; and a resistor-ladder circuit having a first resistor connected between the gate terminal of the second transistor and an intermediate node, and a second resistor connected between the intermediate node and a drain terminal of the second transistor, wherein the voltage-tracking signal is generated at the intermediate node when the third supply voltage reaches the second predetermined voltage.

4. The IC of claim 3, wherein the inverter circuit comprises:
a third transistor having a source terminal for receiving the third supply voltage, and a gate terminal connected to the intermediate node of the resistor-ladder circuit for receiving the voltage-tracking signal; and
a fourth transistor having a source terminal connected to ground, a drain terminal connected to a drain terminal of the third transistor, and a gate terminal connected to the intermediate node of the resistor-ladder circuit for receiving the voltage-tracking signal, wherein the inverted signal is generated at the drain terminal of the fourth transistor.

5. The IC of claim 4, wherein the level-shifter comprises:
a fifth transistor having a drain terminal for receiving the fifth supply voltage by way of a third resistor, a gate terminal connected to the drain terminals of the third and fourth transistors for receiving the inverted tracking signal, and a source terminal connected to ground, wherein the level-shifted tracking signal is generated at the drain terminal of the fifth transistor.

6. The IC of claim 1, wherein the logic gate of the second I/O cell comprises:
a first inverter circuit connected to the trigger signal generation circuit for receiving the second trigger signal and generating a first inverted signal;
a first transistor having a source terminal for receiving a fifth supply voltage, a gate terminal connected to the first inverter circuit for receiving the first inverted signal, and a drain terminal for generating a third trigger signal based on the first inverted signal;
a bypass circuit, connected to the logic cell and the first inverter circuit, for receiving the safe-state signal and the first inverted signal, and generating a safe-state trigger signal based on the first inverted signal; and
a second inverter circuit connected to the drain terminal of the first transistor and the bypass circuit for receiving at least one of the third trigger signal and the safe-state trigger signal, and outputting a second inverted signal that is used to set the second I/O cell in the safe-state mode,
wherein the second inverter circuit receives the third trigger signal when the first inverted signal is at a first logic state and the safe-state trigger signal when the first inverted signal is at a second logic state.

7. The IC of claim 6, wherein the IC has an I/O cell bank comprising a plurality of I/O cells and the second I/O cell is part of the I/O cell bank, wherein input and output interfaces of each I/O cell of the I/O cell bank receive the third and fourth supply voltages, respectively, and each I/O cell of the I/O bank receives the second inverted signal, which sets each I/O cell of I/O cell bank in the safe-state mode.

8. The IC of claim 6, wherein the first inverter circuit comprises:
a second transistor having a source terminal for receiving the fifth supply voltage and a gate terminal connected to the trigger signal generation circuit for receiving the second trigger signal; and a third transistor having a drain terminal connected to a drain terminal of the second transistor and the gate terminal of the first transistor, a gate terminal connected to the gate terminal of the second transistor for receiving the second trigger signal, and a source terminal connected to ground, wherein the first inverted signal is generated at the drain terminal of the third transistor.

9. The IC of claim 8, wherein the bypass circuit comprises:
a fourth transistor having a source terminal for receiving the fifth supply voltage and a gate terminal connected to the logic cell for receiving the safe-state signal;
a fifth transistor having a drain terminal connected to a drain terminal of the fourth transistor and a gate terminal connected to the gate terminal of the logic cell and the gate terminal of the fourth transistor for receiving the safe-state signal; and
a sixth transistor having a drain terminal connected to a source terminal of the fifth transistor, a gate terminal connected to the gate terminal of the first transistor and drain terminals of the second and third transistors for receiving the first inverted signal, and a source terminal connected to ground, wherein the safe-state trigger signal is generated at the drain terminals of the fourth and fifth transistors.

10. The IC of claim 9, wherein the second inverter circuit comprises:
a seventh transistor having a source terminal for receiving the fifth supply voltage, and a gate terminal connected to the drain terminal of the first transistor for receiving the third trigger signal and the drain terminals of the fourth and fifth transistors for receiving the safe-state trigger signal; and
an eighth transistor having a drain terminal connected to the drain terminal of the seventh transistor, a gate terminal connected to the gate terminal of the seventh transistor for receiving at least one of the third trigger signal and safe-state trigger signal, and a source terminal connected to ground, wherein the second inverted signal is generated at the drain terminals of the seventh and eighth transistors and provided to the voltage selection pin therefrom.

11. The IC of claim 1, wherein the first predetermined voltage is less than the second predetermined voltage.

12. The IC of claim 1, wherein the first supply voltage received at the input interface of the first I/O cell has a first peak value, the second supply voltage received at the output interface of the first I/O cell has a second peak value, the third supply voltage received at the input interface of the second I/O cell has a third peak value, and the fourth supply voltage received at the output interface of the second I/O cell has a set of peak values, and wherein the fourth supply voltage reaches at least one peak value of the set of peak values before the third supply voltage reaches the second predetermined voltage.

13. The IC of claim 12, wherein the second I/O cell is configured in the safe-state mode to prevent damage thereof till the fourth supply voltage reaches the at least one peak value of the set of peak values.

14. The IC of claim 12, wherein the second predetermined voltage is less than the third peak value.

15. The IC of claim 1, wherein the first I/O cell is set in a tri-state mode when the first supply voltage is less than the first predetermined voltage and the second I/O cell is set in the tri-state mode when the third supply voltage is less than the second predetermined voltage.

16. The IC of claim 1, wherein the logic cell outputs the safe-state signal before the third supply voltage reaches the second predetermined voltage and after the first supply voltage reaches the first predetermined voltage.

17. A method for configuring an integrated circuit (IC) by placing an I/O cell of the IC in a safe-state mode, wherein the IC includes a logic cell, a trigger signal circuit, a first input/output (I/O) cell having input and output interfaces that receive first and second supply voltages, respectively, and a second I/O cell having input and output interfaces that receive third and fourth supply voltages, respectively, and wherein the second I/O cell includes a voltage selection pin and a logic gate, the method comprising:

generating a first trigger signal with the first I/O cell when the first supply voltage reaches a first predetermined voltage;

outputting a safe-state signal with the logic cell based on the first trigger signal;

generating a second trigger signal with the circuit when the third supply voltage reaches a second predetermined voltage;

receiving the safe-state signal and the second trigger signal at the voltage selection pin by way of a logic gate; and setting the second I/O cell in the safe-state mode based on the voltage selection pin.

18. The method of claim 17, wherein the first predetermined voltage is less than the second predetermined voltage, and the second predetermined voltage is less than a peak value of the third supply voltage.

19. The method of claim 17, wherein the safe-state signal is output by the logic cell when the third supply voltage is less than the second predetermined voltage.

* * * * *